UNITED STATES PATENT OFFICE.

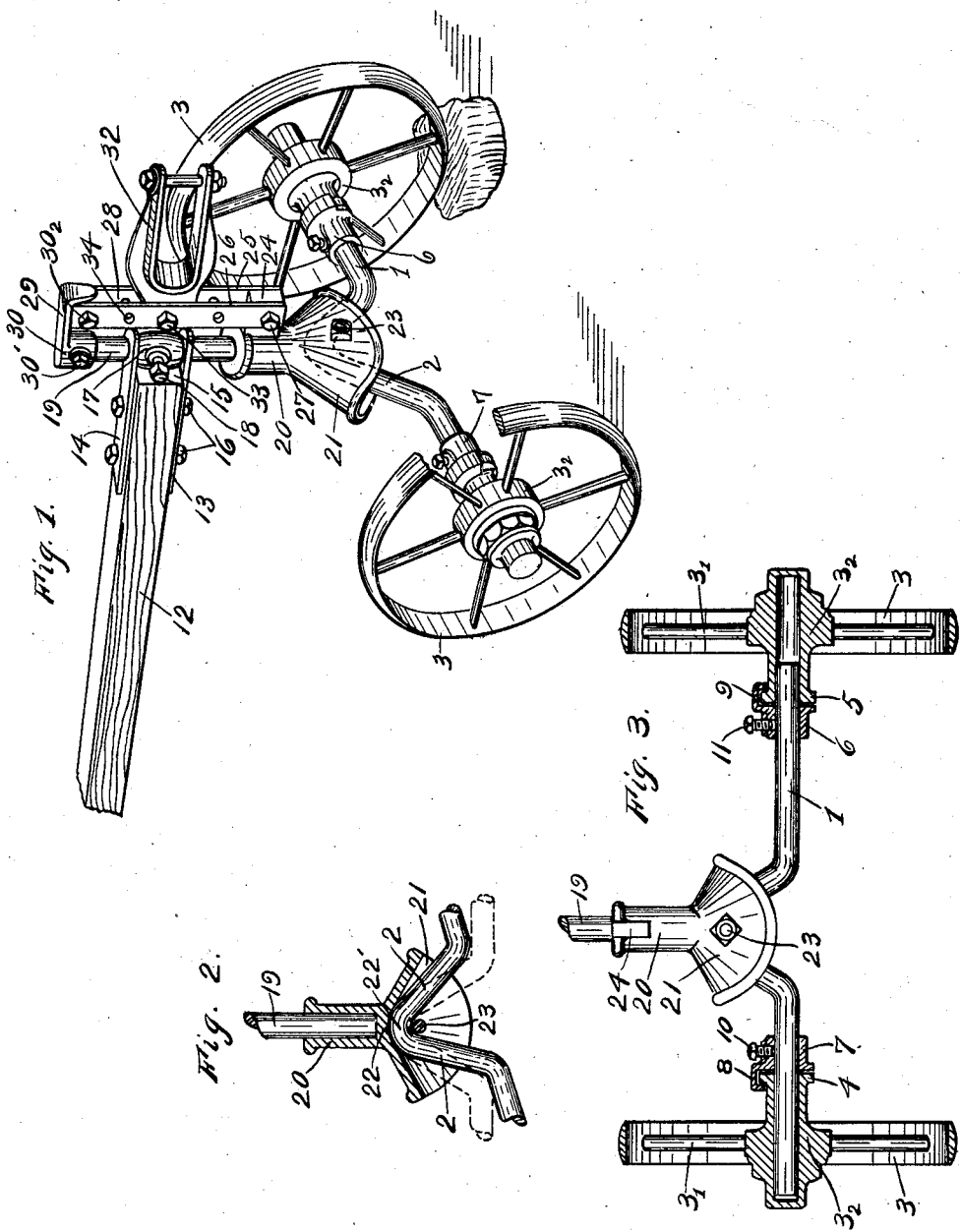

FREDERICK C. WARNE, OF MANSFIELD, OHIO, ASSIGNOR TO THE RODERICK LEAN MANUFACTURING COMPANY, OF MANSFIELD, OHIO, A CORPORATION OF NEW JERSEY.

TRUCK MECHANISM.

1,021,563.   Specification of Letters Patent.   Patented Mar. 26, 1912.

Application filed February 13, 1911. Serial No. 608,346.

*To all whom it may concern:*

Be it known that I, FREDERICK C. WARNE, a citizen of the United States of America, residing at Mansfield, in the county of Richland and State of Ohio, have invented certain new and useful Improvements in Truck Mechanism, of which the following is a specification.

My invention relates to a truck mechanism and is especially adapted to be used with agricultural implements.

The objects of my invention are to provide means of permitting a vertical oscillatory motion of the truck axle; horizontal movement of the truck wheels and axle, both the horizontal movement and the oscillating movement being accomplished either simultaneously or independently of each other; to provide means of adjusting the extremity of the stub tongue relative to the truck mechanism, and to afford means of adjusting the hitch.

A further object of my invention is to provide means of detachably securing the ground wheels to the axle.

The primary feature of my invention consists in bending the axle of the truck mechanism to conform substantially to the shape of an inverted V which is adapted to pivot or oscillate upon its apex within a vertical splay socket of a novel supporting member.

With these and other objects in view, my invention consists in certain novel features of construction and in certain parts and combinations hereinafter described.

In the accompanying drawing:—Figure 1 is a perspective view of my truck showing it assembled and attached to the stub tongue of an agricultural implement. Fig. 2 represents a front elevation of my truck in section showing the method of pivoting the bent portion of the axle within the vertical splay socket of the supporting member. Fig. 3 is an end view of part of the truck showing a cross sectional view of ground wheels and the method of detachably securing the ground wheels to the truck axle.

In the drawings I have not illustrated my invention attached to any particular type of agricultural implement as I do not deem this necessary, and show my invention connected to a stub tongue which in turn can be connected to any of the well known agricultural implements adapted to be used with fore-trucks. The axle of the truck is represented by reference numeral 1 and has the center portion 2—2 bent upward forming substantially an inverted V. The axle is carried by ground wheels 3—3 which revolve around the axle.

The ground wheels 3—3 are provided with hubs $3^2$—$3^2$ having annular peripheral ribs 4 and 5 and are held in place by the retaining collars 6 and 7 which are provided with semi-circular grooved portions 8 and 9, the grooves of which engage the annular ribs 4 and 5 and retain the ground wheels 3—3 in their proper positions upon the axle when the set-screws 10 and 11 which engage suitably threaded apertures formed in the collars are tightened and brought in contact with the truck axle thereby securely holding the collars 6 and 7 upon the shaft and likewise the ground wheels which are detachably connected thereto.

The stub tongue 12 is provided with forwardly extending plates 13 and 14, the free ends extending beyond the forward extremity 15 of the stub tongue forming a bifurcated end for the stub tongue. The plates are held in place by means of through-going bolts 16. A sleeve 17 is provided with a set screw 18 and interposed between the forwardly extending ends of the plates on the stub tongue which forms the bifurcation. A vertical or upright shaft 19 passes through suitable alined apertures in the plates 13 and 14 and through the sleeve 17 depending downwardly below the stub tongue.

The lower end of the shaft 19 is securely fitted into a vertical aperture formed in the supporting member 20. The supporting member 20 is provided on its lower portion with a vertical splay socket 21 and forms a seat 22 for the rounded apex 22′ of the V shape bent portion 2—2 of the axle. A pivot pin 23 passes through suitable apertures in the splay socket directly under the apex of the bent portion 2—2 leaving the said portion interposed between the pivot pin 23 and the seat 22 pivotally securing the axle 1 to the splay socket and providing for oscillatory motion of the shaft. This is especially desirable as the truck mechanism will readily accommodate itself to any obstruction or irregularity in the topography of the soil as shown in Fig. 1, while at the same time maintaining the equilibrium of the implement that is connected thereto.

An outwardly extending lug 24 is provided on the bracket 20 and two bars 25 and 26 are vertically arranged and one end of each bar is securely fastened to the sides of the lug portion 24 by a bolt 27 thereby leaving a space 28. The other ends of the bars 25 and 26 are securely held to the arm 29 of the bracket 30 which is secured to the vertical shaft 19 by set screw 30′ and a bolt 30² securely holds the bars together. One end of the clevis hitch 32 is interposed between the bars in the space 28 and is adapted to be adjusted vertically therebetween by the bolt 33 which connects the clevis to the vertical bars. The adjustment is made by inserting the bolt 33 which carries the clevis in the apertures 34 which are provided in the bars 25 and 26.

It will be noted that when the stub tongue 12 is attached to the truck mechanism, the axle carrying the ground wheels of the truck can rotate in a horizontal direction through the medium of the vertical shaft 19 which has a rotary movement in the brackets 13 and 14. A vertical oscillatory motion is provided for by the bent axle which is formed substantially V shape and pivots within the splay socket 21 of the bracket 20. The apex 22′ of the bent portion 2—2 seats in the top of the splay socket 21.

Attention is called to the fact that an oscillating motion and a horizontal motion of the truck mechanism is obtained either alternately or simultaneously according to the conditions under which the truck mechanism is being operated.

In Fig. 3, one of the ground wheels is shown mounted on the axle in position and the other ground wheel partially on the axle. It will, of course, be understood that the grooved portion of the over-hanging portions 9 of the retaining collars 6 engage the ribs 5 of the hubs and both are slipped on the axle together.

I claim:—

1. A fore-truck, comprising an axle having a portion in the center thereof bent upward from the axis to form a support, a supporting member having a splay socket formed therein adapted to pivotally engage said bent portion, and means to pivotally connect said bent portion or axle to the splay socket for oscillatory vertical motion, as described and set forth.

2. The combination of carrying wheels and an axle having a portion bent out of alinement with its axis, of a supporting member provided with a splay socket and a bearing, means to pivotally connect the supporting member and bent portion of the axle; said supporting member being provided with a lug, vertical bars attached to said lug on one end, a shaft fitted to said supporting member extending in a vertical direction, a bracket fitted to said shaft and to which the vertical bars are attached on one end.

In testimony whereof I affix my signature in presence of two witnesses.

FREDERICK C. WARNE.

Witnesses:
C. A. HINES,
A. H. GLENDINNING.

Copies of this patent may be obtained for five cents each, by addressing the "Commissioner of Patents, Washington, D. C."